United States Patent [19]

Clegg

[11] Patent Number: 4,567,879
[45] Date of Patent: Feb. 4, 1986

[54] PRISMATIC SOLAR BEAM CONCENTRATOR

[76] Inventor: John E. Clegg, 2320 Keystone Dr., Orlando, Fla. 32806

[21] Appl. No.: 718,667

[22] Filed: Apr. 1, 1985

[51] Int. Cl.⁴ ............................................. F24J 2/08
[52] U.S. Cl. .................... 126/440; 126/417; 126/442; 126/451; 126/443; 350/424; 350/286
[58] Field of Search ............... 126/417, 440, 439, 442, 126/451, 432, 438, 443; 350/286, 501, 512, 545, 424, 243, 287, 321

[56] References Cited

U.S. PATENT DOCUMENTS

| 3,547,526 | 12/1970 | Devereux | 350/286 X |
| 4,267,826 | 5/1981 | Hitt, Jr. | 126/440 |
| 4,337,759 | 7/1982 | Popovich et al. | 126/440 X |
| 4,492,439 | 1/1985 | Clegg | 126/440 X |

FOREIGN PATENT DOCUMENTS 00696  8/1980  France .
21749  2/1982  Japan .
2041506  9/1980  United Kingdom .
2100415  12/1982  United Kingdom .

Primary Examiner—Larry Jones

[57] ABSTRACT

A prismatic beam concentrator comprising two equilateral double prisms No. 1 and three equilateral double prisms No. 2 mounted above an expansion flow tube. The prisms receive two convergent incipient beams of diffused sunlight and emit a concentrated sheet beam onto the exterior wall of the expansion flow tube. An expansion flow tube is a straight elongate conical tube with an inlet orifice of minimum diameter (5 mm) and an outlet orifice of maximum diameter (25 mm). Water circulating through the tube is heated by the concentrated sheet beam. The warm water expands outward against the interior wall of the tube and deflects toward the outlet orifice, which is the direction of flow. The deflection of water in the direction of flow increases the rate of flow and decreases the pressure that need be applied by the pump.

1 Claim, 3 Drawing Figures

PRISMATIC SOLAR BEAM CONCENTRATOR

BACKGROUND

Prior art includes the *Prismatic Wall Heater,* U.S. Pat. No. 4,527,546 dated 7/9/85 by this inventor. This heater has an equilateral double prism No. 1 and equilateral double prism No. 2 mounted on a roof and projecting a concentrated sheet beam through a cavity in a wall to a metal baseboard plate at the bottom of the wall.

Concurrent art includes the *Prismatic Beam Concentrator,* Ser. No. 661,988 dated 10/18/84 by this inventor. This concentrator is identical to the concentrator disclosed in this application.

Concurrent art also includes the *Expansion Flow Tube,* Ser. No. 730,919 filed 5/6/85 by this inventor. This tube is much shorter than the tube which will be used in practice.

DRAWINGS

DESCRIPTION

Figure 1:
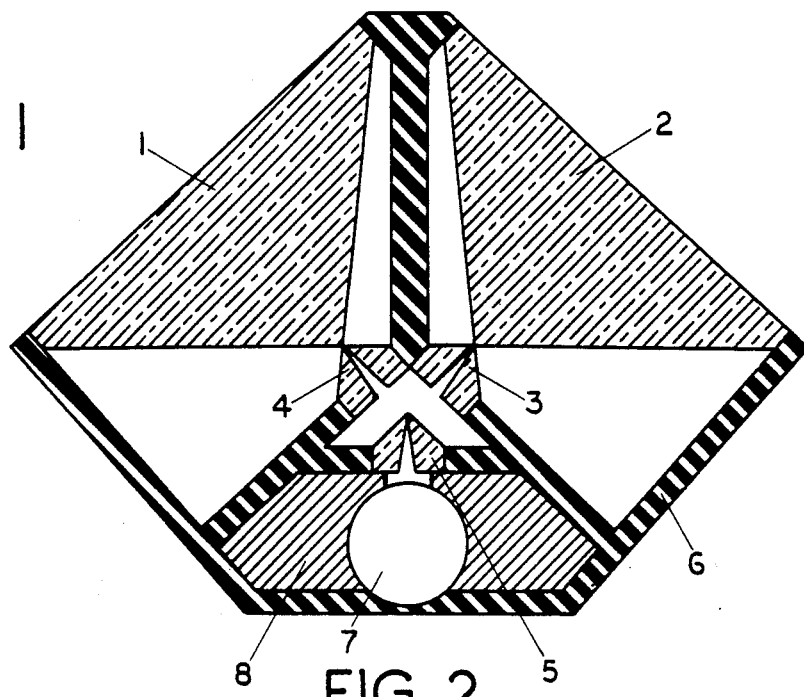
FIG. 1 is an elevation of the prismatic solar beam concentrator with the prisms shown in section.

FIG. 1 is an elevation of the prismatic solar beam concentrator showing equilateral double prisms No. One 1 and 2 mounted above equilateral double prisms No. Two 3, 4 and 5 inside housing 6, with the expansion flow tube 7 mounted below prism 5 and packed in insulation 8.

Figure 2:
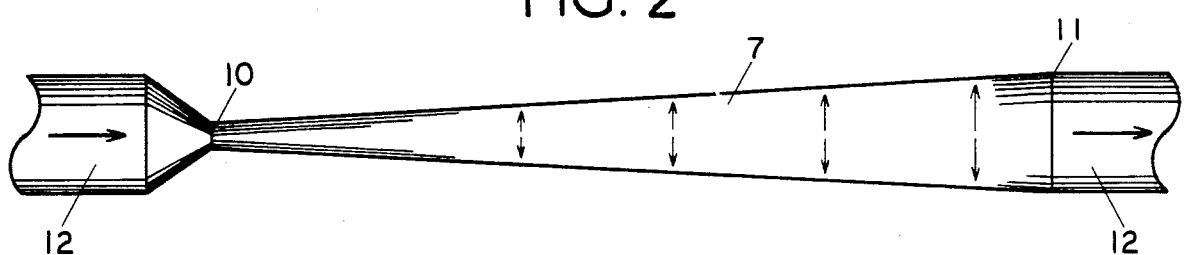
FIG. 2 is a longitudinal section of the expansion flow tube.

FIG. 2 is a longitudinal section of the expansion flow tube comprising a straight elongate conical tube 7 with inlet orifice 10 of minimum diameter (5 mm), outlet orifice 11 of maximum diameter (25 mm) and copper tubing 12. A short tube with an exaggerated angle of deflection off the interior wall is shown in order to better illustrate the mechanics of flow (horizontal arrows), expansion (vertical arrows) and deflection in the direction of flow. In practice the beam concentrator and flow tube will be 6 meters (20 feet) or more in length.

Figure 3:
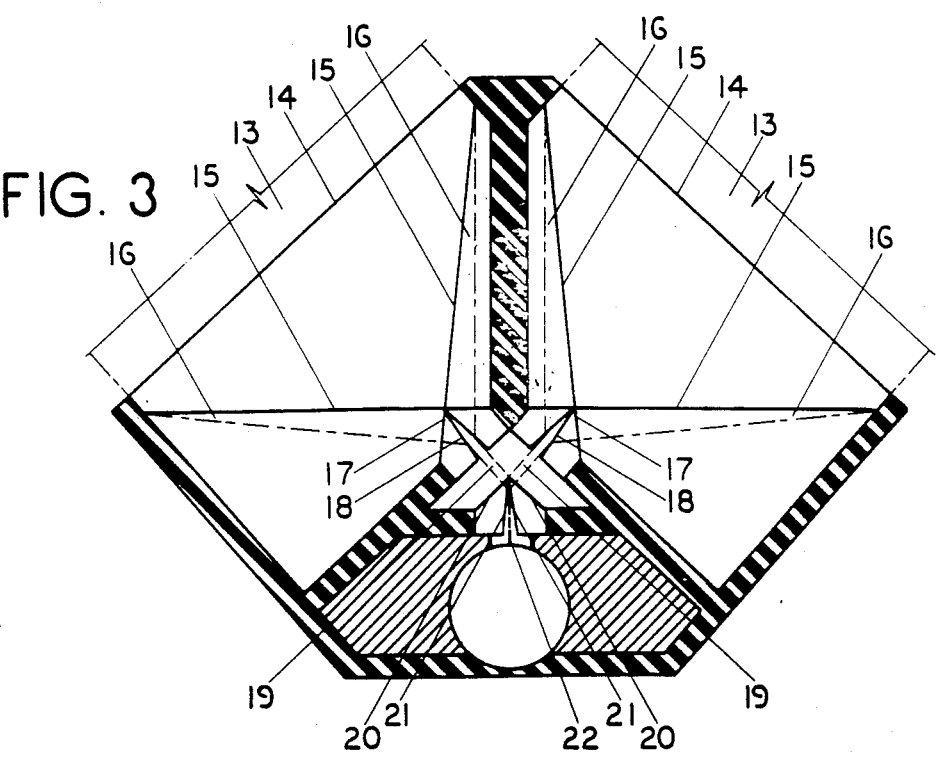
FIG. 3 is an elevation of the prismatic solar beam concentrator with a ray diagram.

FIG. 3 is an elevation of the prismatic solar beam concentrator with a ray diagram. Two convergent rectangular incipient beams 13 of diffused sunlight are received and transmitted by planar faces 14 and refracted by angular wedge faces 15 of prisms 1 and 2, forming two concentrated convergent rectangular beams 16.

Beams 16 are transmitted by angular wedge faces 17 and refracted by angular V-groove faces 18 of prisms 3 and 4, forming two concentrated convergent sheet beams 19.

The prismatic planes of prisms 1, 2, 3 and 4 are inclined 42.5° from the vertical plane.

Beams 19 are transmitted by angular wedge faces 20 and refracted by angular V-groove faces 21 of prism 5, forming concentrated sheet beam 22 which is emitted in the vertical prismatic plane onto the exterior wall of expansion tube 7.

Each refraction reduces the beam width by a factor of 0.1414. There are three refractions, so the factor of total reduction of width of incipient beams 13 is 0.0028, as follows;

Incipient beam width ×0.0028 = concentrated beam
width 200 mm×0.0028 = 0.56 mm

I claim;
1. A prismatic solar beam concentrator comprising;
   a. two equilateral double prisms (1,2), each having a planar face (14) and two angular wedge faces (15), with the prismatic plane bisecting the planar face (14) and the edge formed by the junction of the two angular wedge faces (15) being inclined 42.5° from the vertical plane,
   b. two equilateral double prisms (3,4) mounted below prisms (1,2), each having two angular wedge faces (17) and two angular V-groove faces (18), with the prismatic plane bisecting the edges formed by the junction of the two angular wedge faces (17) and the junction of the two angular V-groove faces (18) being inclined 42.5° from the vertical plane,
   c. an equilateral double prism (5) mounted below prisms (3,4) and having two angular wedge faces (20) and two angular V-groove faces (21), with the prismatic plane bisecting the edges formed by the junction of the two angular wedge faces (20) and the junction of the two angular V-groove faces (21) occupying the vertical plane, and
   d. an expansion flow tube mounted below the equilateral double prism (5) and comprising a straight elongate conical tube (7) with an inlet orifice (10) of minimum diameter and an outlet orifice (11) of maximum diameter.

* * * * *